INVENTOR.
WILLIAM DONALD KUNTZ
BY
ATTORNEYS

April 21, 1970     W. D. KUNTZ     3,507,463
THRUST INDUCED VORTEX LIFT ARRANGEMENT FOR AIRCRAFT
Filed Jan. 18, 1968     4 Sheets-Sheet 3

INVENTOR.
WILLIAM DONALD KUNTZ
BY
Smythe & Moore
ATTORNEYS

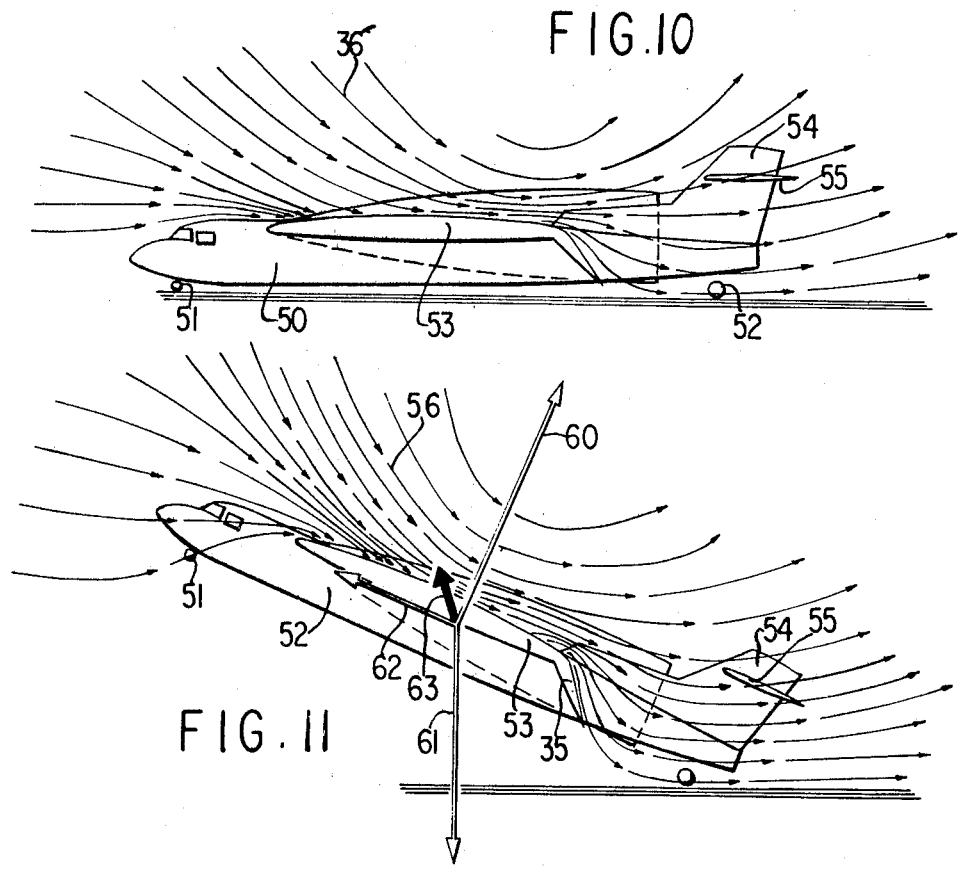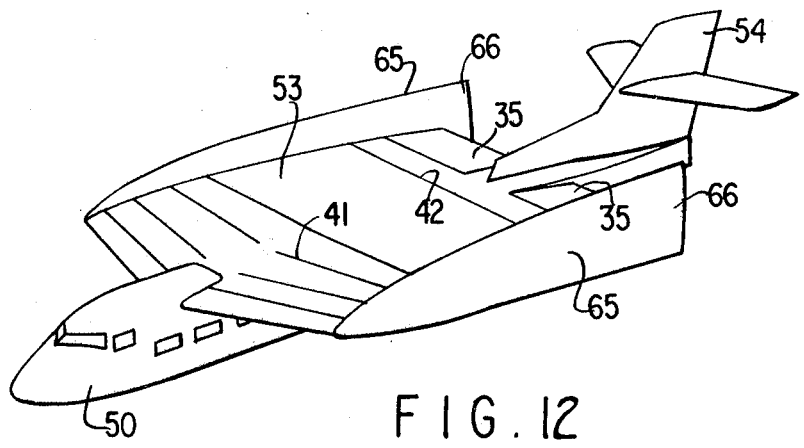

United States Patent Office 3,507,463
Patented Apr. 21, 1970

1

3,507,463
THRUST INDUCED VORTEX LIFT ARRANGEMENT FOR AIRCRAFT
William Donald Kuntz, 1830 Park Ave.,
Bridgeport, Conn. 06604
Filed Jan. 18, 1968, Ser. No. 698,909
Int. Cl. B64c 21/02
U.S. Cl. 244—42                          2 Claims

ABSTRACT OF THE DISCLOSURE

A V/STOL (vertical or short takeoff and landing) aircraft characterized by a thrust induced vortex lift arrangement produced by at least one elongated air inlet slot in the top surface of the wing adjacent the leading edge, and at least one air flow accelerator such as a turbo-jet embedded in or positioned below the upper surface of the wing connected to the air inlet slot and receiving all its air input therefrom, and at least one air discharge or outlet slot in the top surface of the wing adjacent the trailing edge connected to the air flow accelerator and receiving all of the air discharged therefrom, creating a low pressure area over the top wing surface between the slots causing the discharged air initially to flow back toward the inlet slot inducing an artificial lift-producing vortex perpendicular to the axis of thrust at stationary or low forward aircraft speed creating a substantially vertical lift on the top surface of the wing to raise the aircraft.

---

This invention relates to aircraft, and more particularly to the so-called V/STOL aircraft (vertical or short takeoff and landing) aircraft.

A primary object of the invention is the provision of such an aircraft provided with a thrust induced vortex lift arrangement whereby an artificially induced vortex is created across the wing span, creating a low pressure lift area thereover which, combined with other elements of construction, suffices to lift the aircraft either vertically or after an exceptionally short takeoff run.

An additional object of the invention resides in the provision of means inherent in the aircraft for inducing such artificial vortex at will.

A more specific object of the invention resides in the configuration of a wing structure, including a forward air intake slot or slots, and corresponding air discharge slots adjacent the trailing edge of the wing.

A further object of the invention resides in the provision of an aircraft of this nature which is extremely stable and which will respond to the artificially induced vortex either on takeoff or landing, but which will have flight characteristics similar to conventional aircraft at normal forward speed.

A further object of the invention resides in the provision of an improved wing structure for achieving the above and other objects.

Other advantages, objects and features of the invention will be apparent upon reference to the following description taken in conjunction with the accompanying drawings which are merely exemplary.

In the drawings:

FIG. 10 is a schematic view showing the initial air flow pattern on an aircraft at rest on the ground upon energization of the engines;

FIG. 11 is a view similar to FIG. 10 showing the initial aspect of vertical takeoff showing a portion of the induced vortex and the various force vectors in action at this point; and FIG. 12 is a perspective view, partially schematic, showing one form of aircraft design embodying the instant inventive concept.

As conducive to a clearer understanding of the present invention, it is pointed out that previous solutions to the problems of lifting heavier-than-air craft have incorporated one of several approaches. For example, in conventional aircraft, thrust is employed to move a wing to sweep a large area at a speed sufficient to impart a downward velocity to a large mass of air.

The helicopter approach is well known, and other approaches such as the Chance-Vought flying pancake, the Custer channel-wing aircraft and the Fuller jet powered helicopter have also been attempted. Various disadvantages have been inherent in all of these in that, in the conventional approach, a relatively long takeoff and landing run has been required, and in the helicopter approach, forward speed has been sacrificed to vertical flight characteristics.

In accordance with the present invention, an unconfined vortex is created running longitudinally of the wing span. Such a vortex is non-uniform, having an eccentric center as in a section formed by a family of circles, the centers of which lie on an approximately straight line, the circles approaching tangency along the upper surface of the wing.

This vortex, according to the momentum available from the energy transferred to the air mass, either lifts the aircraft towards the center of the vortex or creates sufficient lift to materially shorten the required takeoff run.

The applicant's invention contemplates air movement in the flight direction over the top surface of the wing only and built to a considerable velocity close to the surface. As the air passes the trailing edge of the wing, its energy is dissipated against the air behind it. The air gases in the mass acted upon seek the path of least resistance, due to the small clearance between the wing and the ground, and rise. The rising is enhanced by the lower density of the moving air, furthered by the added heat in the combustion process of the thrust engine. Simultaneously, air is pulled continuously across the wing from the leading edge, creating an initial unstable condition with a low pressure volume above the leading edge from the suction. As the air from the trailing edge rises, it mixes with the air being drawn down toward the leading edge, creating a non-uniform induced vortex.

Figure 1:
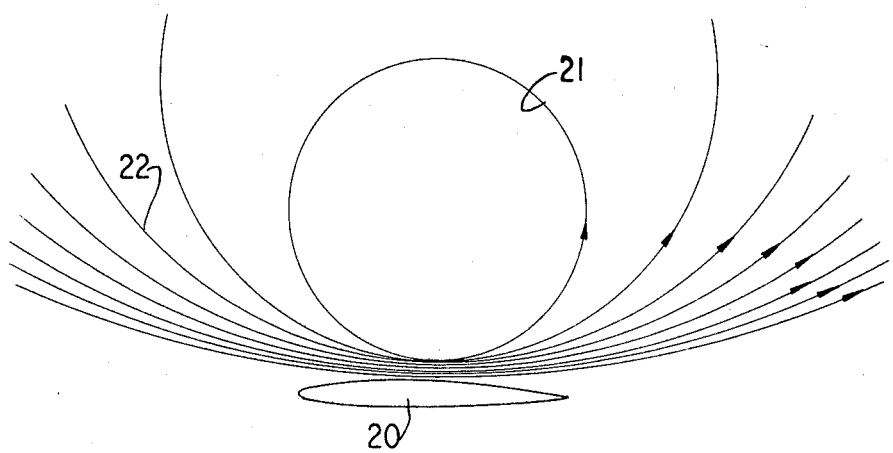
FIG. 1 is a schematic view showing an airfoil wing and an artificially induced vortex thereover.

A section of a wing is disclosed in FIG. 1 at 20 with an induced unconfined eccentric vortex being indicated by the circular line 21 and the upwardly curved lines 22 which vertically converge at undetermined points above the wing surface.

Figure 2:
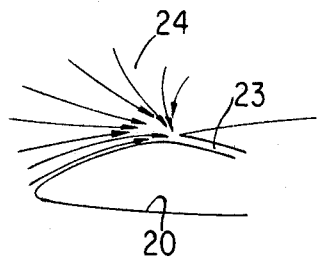
FIG. 2 is a schematic view partially broken away showing the path of air drawn into the inlet slot of a wing constructed in accordance with the instant invention.
Figure 3:
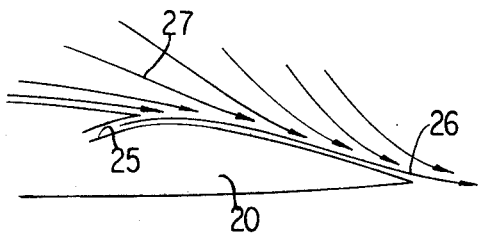
FIG. 3 is a schematic view similar to FIG. 2 showing the path of air from the air discharge slot and air drawn from the wing top surface.
Figure 4:
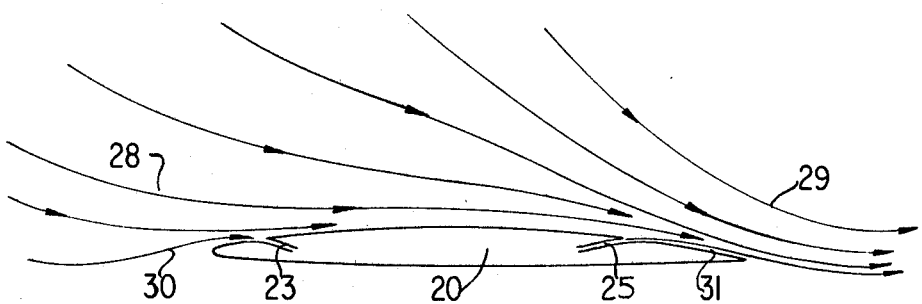
FIG. 4 is a schematic view showing in idealized form the air flow stream lines of the artificially induced vortex.

FIG. 2 discloses a top surface of a wing 20 provided with a single air inlet slot 23 which draws air inwardly as indicated by the arrows 24. FIG. 3 shows that the air, after being accelerated in the interior of the wing, is dischargde rearwardly through a slot 25 as indicated by the arrow 26, and in turn mixes with air drawn rearwardly over the top surface of the wing as indicated by arrows 27. FIG. 4 shows the path of air being drawn downwardly and rearwardly as indicated by the arrows 28, and initially curved upwardly as indicated by the arrows 29. Arrows 30 and 31 show the air being drawn into slot 23 and discharged through slot 25.

As air is drawn in at the forward intake slot 23, its speed increases up to the time it enters the intake, such air coming principally, due to the alignment of the slot, from ahead of the slot aligned with the suction. The air thus comes from along the leading edge at its greatest speed, and at lessening speeds at increasing heights above the forepart of the profile as shown in FIG. 2. The ingested air lowers the pressure of the air mass, creating a lowered pressure space above and ahead of the intake. Simultaneously, the ambient static air reacts on the bottom surface of the wing to exert a lifting force. The exhaust stream through slot 25, due to the kinetic energy imparted by the engine, will have a much higher speed and consequent lower pressure. The ingested air will flow in the direction of the jet as seen in FIG. 3, and as it leaves the trailing edge, will tend to rise.

Figure 5:
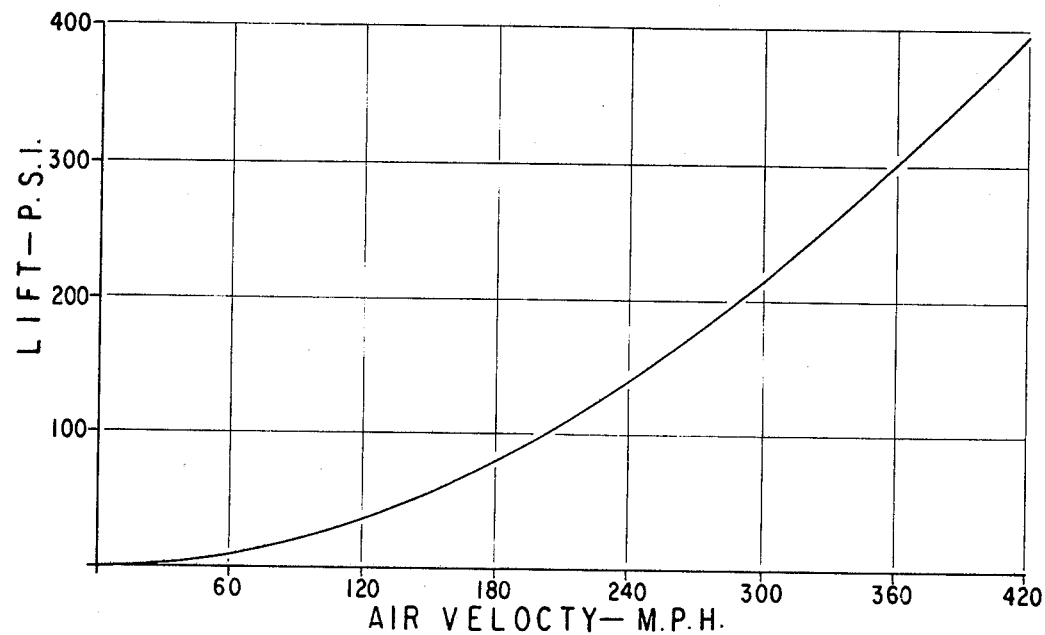
FIG. 5 is a graph showing lift in pounds per square foot in terms of air velocity of the vortex.
Figure 8:
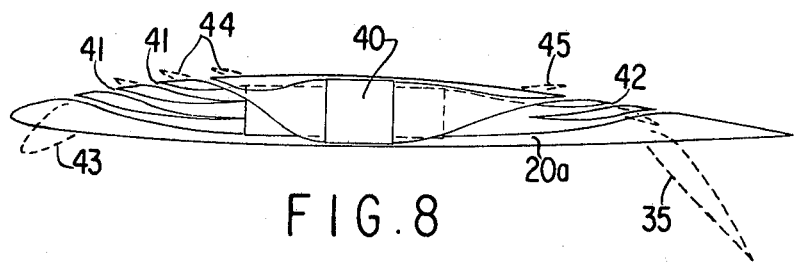
FIG. 8 is a schematic showing in profile section of a turbo-fan engine in association with multiple air inlet and discharge slots.

A vortex sector is thus created, and the air mass beyond the trailing edge will flow forwardly to replace that drawn down at the leading edge. The flow beneath the wing will be restricted due to the tendency of the air to rise, and may be further retarded by air flaps 35 as shown in FIG. 8, for example. The vortex is thus created directly above the wing where the air mass is high and the density from Bernoulli's theorem is low. This relationship is shown in FIG. 5 as a curve plotted as lift versus speed from the following equation:

$$p_o = \frac{p_s}{\left[1 + \left(\frac{k-1}{2}\right)\frac{V^2}{kgRT}\right]^{\frac{k}{k-1}}}$$

where:

$p_o$ = reduced pressure due to velocity
$p_s$ = stagnation or static pressure (ambient atmosphere)
$k$ = specific heat ratio (pressure/volume) for air
$g$ = gravitational constant
$R$ = gas constant for air
$T$ = absolute temperature
$V$ = velocity all in consistent units at standard temperature and pressure.

The lift indicated in FIG. 5 is realized at zero forward speed of the aircraft, because it is induced entirely from the thrust provided by the engines, the thrust thus being directly transformed into lift, regardless of the air foil section required for flight operation. An additional benefit is derived from the reduced noise level due to the rapid dissipation of the thrust film and the reflection of the noise upwardly by the wing surface.

Figure 6:
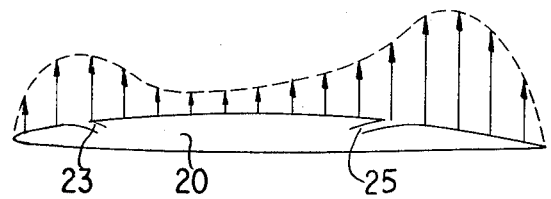
FIG. 6 is a schematic showing of the lift pattern achieved by single air inlet and discharge slots.
Figure 7:
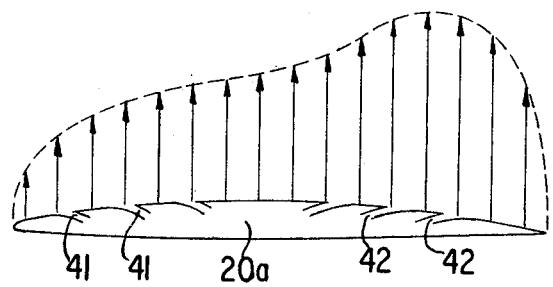
FIG. 7 is a view similar to FIG. 6 showing a lift pattern achieved by multiple air inlet and discharge slots.

The center of lift is also towards the rear of the profile, as shown in FIGS. 6 and 7, which is desirable for high speed aircraft.

Since this system will obtain these air velocities readily at zero forward speed, an aircraft with a thrust induced vortex lift system will be able to take off and land vertically. Overloading the airplane will require it to merely run a short distance to become airborne. An aircraft so equipped will take off and land normally in a rather nose-high attitude in order to make optimum use of the low pressure volume of the vortex. It will rotate itself upwards on its rear landing gear to hold the axis of the vortex as nearly directly above its wing as possible, using the initial lift to raise the nose. Transition to level flight can be begun as soon as airborne. As speed increases horizontally, the wings will lift as with more conventional aircraft, and a smooth transition will result when the wing changes slowly from vortex support to normal planing action on the air. The true vortex will be left behind to decay, while during transition the lift induction atop the wing will continue as though a fraction of the vortex were carried along and the wing is building up lift in a conventional fashion of level flight.

The lifting-force pattern, illustrated by approximate vectors, is shown in FIG. 6 where a single intake and exhaust slot is shown. The greater lift towards the trailing edge is due, of course, to the energy added to the ingested air by the engine's combustion process. In FIG. 7 the advantage of multiple intake and exhaust slots is shown, because they effectively diminish the mid-wing flow of entrained air to a relatively negligible amount. The entrained air flow still occurs, but at a greater height above the mid-wing area. The mid-wing area will be defined as the space between the rearmost intake slot and the foremost exhaust slot.

The actual ducting arrangement for a turbofan engine is illustrated in profile section in FIG. 8. The trailing edge flap is shown in one of many possible variations, this being a method of attaining added lift only, and not necessarily germane to this discussion. In fact, it is entirely possible to provide extension and deflection of any of the exhaust ducts so that they pass through and conform to the flap or multiple flap components. In the same manner, a leading edge that is rotatable downward may be used for additional lift at low speeds. Although not shown, it should be considered that variable intake and exhaust openings may prove advisable. At low speeds, it is desirable to aid air ingestion by opening the intake slot area vertically by either depressing the underside of the entrance or lifting the top edge. The same holds true for the exhaust slots. Further, the exhaust may be augmented by afterburners, using the aforementioned method of increasing slot area.

Figure 9:
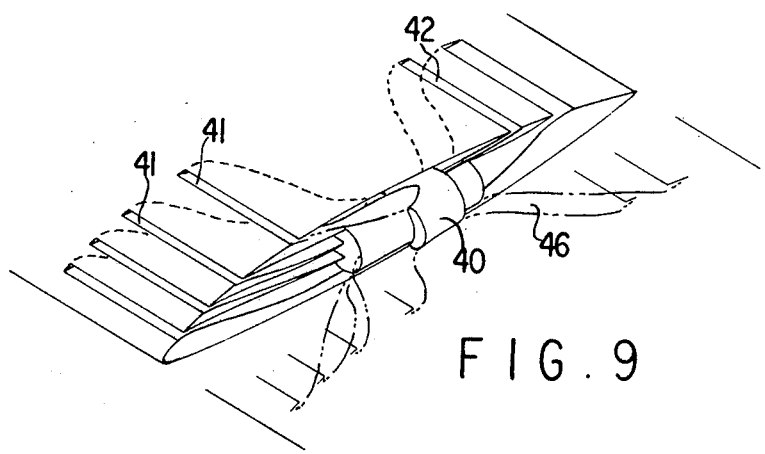
FIG. 9 is a perspective view of the arrangement shown in FIG. 8 disclosing the required transition sections in the ducting.

FIGS. 8 and 9 disclose a preferred ducting arrangement for a turbofan engine wherein the wing is generally indicated at 20a, provided with a turbofan engine 40 embedded therein having a plurality of spaced slots 41 adjacent the leading edge, and a plurality of air discharge slots 42 adjacent the trailing edge. The trailing edge flap 35 is shown, while a rotatable leading edge 43 may be provided for further enhancing lift. Variable intake and exhaust openings may be provided by control flaps 44 and 45 respectively. In FIG. 9 the relative width of slots 41 is disclosed as being preferably approximately the length of about eight turbine diameters. Any number of similar arrangements may be provided spanwise depending upon load and performance requirements.

FIG. 9 discloses a plurality of independent ducts with independent intakes. While a single main exhaust duct 46 is disclosed, this may obviously be varied as required.

In FIG. 10 there is shown schematically a small air liner of the feeder-line type including a fuselage 50, forward wheels 51, rear or main landing wheels 52, and wings 53, the latter being constructed in accordance with the wings of FIGS. 8 and 9, with components omitted for the sake of clarity. A tail 54 is provided with a vertical fin 55 having conventional elevators. It is noted that the elevators are shown in normal flight position, since such elevators would act only as supplemental controls. As the speed of air lift increases with the rear wheels braked, the front end tends to lift as shown in FIG. 11, the arrows 56 indicating the lower tangential edge of the lift vortex previously described. The full arrows of FIG. 12 indicate the force vectors involved, arrow 60 indicating the lift vector, 61 the weight vector, and 62 the thrust vector, all of which combine to create a lift as indicated at 63.

As the lift is continued, there is an actual liftoff with no forward speed, the thrust being balanced against the lift to produce a force vector greater than the weight, resulting in vertical motion only. As forward thrust is gradually increased by acceleration, the wing begins to act as a conventional wing, supplying lift through forward motion, and the aircraft begins to slide out from under its vortex which diminishes and eventually vanishes due to the aircraft's outdistancing it. A short takeoff run may be imparted if desired. Landing is accomplished in substantially the same way. As the craft's forward speed is diminished, the vortex builds, and the craft will descend as a hover craft. The aircraft of FIG. 10 is shown more fully in FIG. 12 which shows the intake slots 41 and the discharge slots 42, as well as flaps 35. Added control may be effected in this case by vertical wing-tip fins 65 which increase above and below the wing in height rearwardly to match an increasing lift pattern. Such fins will serve to retain the lift against tip spillage against low forward speeds, and will provide stability in yaw at high speeds. Conventional rotors 66 may be mounted at the ends of such fins if desired.

What is claimed is:

1. A V/STOL aircraft having wing means, gas turbine continuous thrust accelerating means entirely enclosed in said wing means, said accelerating means having at least one intake duct forming an elongated air inlet slot extending through the top surface of said wing means adjacent to and in substantial parallelism with the leading edge thereof, the entrance to said inlet slot being shaped to draw air preferentially from ahead of said slot, at least one outlet duct extending from the exhaust of said accelerating means and terminating in at least one elongated discharge slot adjacent the trailing edge of said wing means at its upper surface and in parallelism thereto, whereby a low pressure area is created over the top surface of said wing means between said inlet and outlet slots inducing a lift producing vortex.

2. The structure of claim 1 wherein there are a plurality of spaced air inlet slots adjacent the leading edge of the wing means and there are a plurality of outlet slots, the accelerating means being connected by ducts to said slots.

References Cited

UNITED STATES PATENTS

| | | | |
|---|---|---|---|
| 2,041,795 | 5/1936 | Stalker | 244—12 |
| 2,585,676 | 2/1952 | Poisson-Quinton | 244—40 |
| 2,659,552 | 11/1953 | Stalker | 244—15 X |
| 2,821,351 | 1/1958 | Utgoff | 244—42 X |
| 3,029,044 | 4/1962 | Childress | 244—42 X |
| 3,202,383 | 8/1965 | Le Bel et al. | 244—42 |

FOREIGN PATENTS

| | | |
|---|---|---|
| 539,614 | 11/1931 | Germany. |
| 584,585 | 9/1933 | Germany. |
| 886,889 | 7/1943 | France. |
| 888,168 | 1/1962 | Great Britain. |

OTHER REFERENCES

E. Ower and J. I. Nayler, High Speed Flight, Philosophical Library, New York, 1957, pp. 91–94.

MILTON BUCHLER, Primary Examiner

J. L. FORMAN, Assistant Examiner

U.S. Cl. X.R.

244—55